United States Patent
Pathak et al.

(10) Patent No.: US 10,079,833 B2
(45) Date of Patent: Sep. 18, 2018

(54) DIGITAL RIGHTS MANAGEMENT SYSTEM WITH CONFIRMATION NOTIFICATION TO DOCUMENT PUBLISHER DURING DOCUMENT PROTECTION AND DISTRIBUTION

(71) Applicant: KONICA MINOLTA LABORATORY U.S.A., INC., San Mateo, CA (US)

(72) Inventors: Rabindra Pathak, San Jose, CA (US); Kyohei Shiraishi, San Mateo, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/673,675

(22) Filed: Mar. 30, 2015

(65) Prior Publication Data
US 2016/0294832 A1 Oct. 6, 2016

(51) Int. Cl.
*H04L 29/06* (2006.01)
*G06F 17/30* (2006.01)
(Continued)

(52) U.S. Cl.
CPC ...... *H04L 63/101* (2013.01); *G06F 17/30011* (2013.01); *G06F 21/10* (2013.01); *G06F 21/6209* (2013.01); *G06F 2221/0768* (2013.01)

(58) Field of Classification Search
CPC ... G06F 3/12; G06F 21/10; H04L 9/00; H04L 63/101
(Continued)

(56) References Cited

U.S. PATENT DOCUMENTS 6,718,328 B1 * 4/2004 Norris ............... G06F 21/10
707/758
7,076,652 B2 * 7/2006 Ginter ............... G06F 21/10
348/E5.006
(Continued)

OTHER PUBLICATIONS

Adobe Systems Incorporated, "Adobe LiveCycle ES3 Overview: Rights Management", http://help.adobe.com/en_US/livecycle/10.0/Overview/WS92d06802c76abadb2c8525912ddcb9aad9-7ff8.html, 7 pages, printed from the internet on Apr. 15, 2014.
(Continued)

*Primary Examiner* — Morshed Mehedi
*Assistant Examiner* — Dereena T Cattungal
(74) *Attorney, Agent, or Firm* — Chen Yoshimura LLP

(57) ABSTRACT

A digital rights management (DRM) method for protecting digital documents, implemented in a DRM system. When an operator (document publisher) scans a document on a scanner to generates a digital document and specifies a list of users who will be granted access rights to the document, the DRM system applies digital rights protection to the document according to the specified access rights, and distributes the document to the specified users; the system also sends a confirmation notification such as an email to the document publisher, which contains a list of the receiving users, a copy of the protected digital document, and a link to a web-based tool that will allow the publisher to modify the access rights granted to the users. In addition, when applying digital rights protection, the DRM system specifies the publisher as a user who will have access rights to the document.

14 Claims, 3 Drawing Sheets

(51) Int. Cl.
*G06F 21/10* (2013.01)
*G06F 21/62* (2013.01)

(58) Field of Classification Search
USPC ............... 726/26–30; 705/50–59; 713/150
See application file for complete search history.

(56) References Cited

U.S. PATENT DOCUMENTS

| | | | | |
|---|---|---|---|---|
| 8,340,346 | B2* | 12/2012 | Saito | H04N 1/00846 |
| | | | | 382/100 |
| 8,826,375 | B2* | 9/2014 | Smith | G06Q 10/10 |
| | | | | 709/201 |
| 2005/0008163 | A1* | 1/2005 | Leser | H04L 9/08 |
| | | | | 380/281 |
| 2007/0088788 | A1* | 4/2007 | Goldberg | G06Q 10/107 |
| | | | | 709/206 |
| 2007/0150299 | A1* | 6/2007 | Flory | G06Q 10/10 |
| | | | | 705/51 |
| 2007/0271592 | A1* | 11/2007 | Noda | G06F 21/6218 |
| | | | | 726/1 |
| 2009/0100529 | A1* | 4/2009 | Livnat | G06F 21/10 |
| | | | | 726/28 |
| 2009/0249488 | A1* | 10/2009 | Robinson | G06F 21/10 |
| | | | | 726/26 |
| 2010/0037998 | A1* | 2/2010 | Bray | B64C 3/182 |
| | | | | 148/690 |
| 2010/0100899 | A1* | 4/2010 | Bradbury | H04N 7/173 |
| | | | | 725/29 |
| 2011/0007348 | A1* | 1/2011 | Yamaizumi | G06F 21/6209 |
| | | | | 358/1.15 |
| 2011/0037998 | A1* | 2/2011 | Hoshino | H04N 1/32037 |
| | | | | 358/1.15 |
| 2012/0192267 | A1* | 7/2012 | Aizawa | G06F 21/6218 |
| | | | | 726/17 |
| 2013/0031637 | A1* | 1/2013 | Avina | G06F 21/10 |
| | | | | 726/26 |
| 2013/0117400 | A1* | 5/2013 | An | H04L 63/0823 |
| | | | | 709/206 |
| 2014/0020115 | A1* | 1/2014 | Le Chevalier | G06F 17/30014 |
| | | | | 726/28 |
| 2014/0208122 | A1* | 7/2014 | Mathur | G06F 21/10 |
| | | | | 713/176 |
| 2014/0281870 | A1* | 9/2014 | Vogel | G06F 17/246 |
| | | | | 715/220 |
| 2014/0282842 | A1 | 9/2014 | Pathak | |
| 2014/0304714 | A1* | 10/2014 | Shapiro | G06F 9/542 |
| | | | | 719/318 |
| 2015/0248560 | A1 | 9/2015 | Pathak | |

OTHER PUBLICATIONS

Adobe Systems Incorporated, "Programmatically applying policies", http://help.adobe.com/en_US/livecycle/10.0/Overview/WSb96e41f8a4ca47a9-4882aeb5131190eddba-8000.html, 1 page, printed from the internet on Apr. 9, 2014.

Adobe Systems Incorporated, "LiveCycle® ES Java™ API Reference", http://livedocs.adobe.com/livecycle/es/sdkHelp/programmer/javadoc/index.html, 3 pages, printed from the internet on Apr. 9, 2014.

Microsoft, "Active Directory Rights Management Services", http://technet.microsoft.com/en-us/windowsserver/dd448611.aspx, 2 pages, printed from the Internet on Nov. 10, 2014.

Microsoft, "AD RMS Overview", http://msdn.microsoft.com/library/cc530389(VS.85).aspx, 6 pages, printed from the internet on Nov. 10, 2014.

Microsoft, "Using the AD RMS SDK", http://msdn.microsoft.com/en-us/library/cc542552(v=vs.85).aspx, 1 page, printed from the internet on Nov. 10, 2014.

Microsoft, "AD RMS Documentation Roadmap", http://technet.microsoft.com/en-us/library/dd772711.aspx, 3 pages, printed from the internet on Nov. 10, 2014.

Canon. U.S.A., Inc., "Safeguarding information Within Documents and Devices", http://www.usa.canon.com/CUSA/assets/app/pdf/ISG_Security/brochure_run_iradv_security_.pdf, 8 pages, printed from the internet on Feb. 28, 2014.

* cited by examiner 28, 37

| Policy ID | Other policy terms | User ID | View | Print | Copy |
|---|---|---|---|---|---|
| Policy1 | policy terms | User1 | Yes | Yes | Yes |
| | | User2 | Yes | Yes | |
| | | User3 | Yes | Yes | |
| Policy2 | policy terms | User1 | Yes | Yes | Yes |
| | | User3 | Yes | | Yes |
| | | User4 | Yes | | Yes |
| | | User5 | Yes | | Yes |
| | | ... | | | |
| ... | | | | | |

| Document ID | Policy ID | Encryption key | User access rights (view) | etc. |
|---|---|---|---|---|
| Doc ID1 | Policy1 | Key1 | User1, User2, User3, UserP1 | |
| Doc ID2 | Policy2 | Key2 | User1, User3, User4, User5, UserP2 | |
| Doc ID3 | Policy1 | Key3 | User1, User2, User3 | |
| ... | | | | |

Fig. 3B

DIGITAL RIGHTS MANAGEMENT SYSTEM WITH CONFIRMATION NOTIFICATION TO DOCUMENT PUBLISHER DURING DOCUMENT PROTECTION AND DISTRIBUTION

BACKGROUND OF THE INVENTION

Field of the Invention

This invention relates to digital rights management for digital documents, and in particular, it relates to a method implemented on a system including a scanner or other devices for applying digital rights to scanned documents with confirmation notification to the document publisher during document protection and distribution.

Description of Related Art

Documents traditionally available only in hard copies are increasingly also available in digital copies. In fact many documents nowadays are prepared, generated, stored, distributed, accessed, read or otherwise used electronically in digital file formats such as the Portable Document Format (PDF). With the wide use of digital documents and digital document processing, digital rights management systems ("DRM" or "RMS") are increasingly implemented to control user access and prevent unauthorized use of digital documents. The rights involved in using a digital document may include the right to view (or "read") the digital document, the right to edit (or "write") the digital document, the right to print the digital document in hard copies, the right to copy the digital document, etc. A user may access a digital document by acquiring (or being assigned) one or more of these rights.

DRM systems are generally implemented for managing users' rights to the digital documents stored in the systems. In a current DRM system, each digital document is associated with a rights management policy (or simply referred to as policy in this disclosure) that specifies which user has what rights to the document, as well as other parameters relating to access rights. Many such policies are stored in a DRM server (also called RMS server). The server stores a database table that associates each document (e.g. by a unique ID, referred to as document ID or license ID) with a policy (e.g. by policy ID). Each digital document may also have metadata that contains the document ID. When a user attempts to access a document (either a document residing on a server or a document that has been downloaded or copied to the user's computer) using an application program such as Adobe™ Reader, the application program contacts the DRM server to request permission. The DRM server determines whether the requesting user has the right to access the document in the attempted manner (view, edit, print, etc.), by determining the policy associated with the document and then referring to the content of that policy. The DRM server then transmits an appropriate reply to the application program to grant or deny the access. If access is granted, the server's reply may contain a decryption key to decrypt the document.

Scanner devices (including multi-function printers (MFP) that have printing, scanning and copying functions integrated in one device, or a device that has only a scanning function) are used to scan hardcopy documents to generate digital documents. Some scanners are equipped with DRM management functions to manage digital rights of the digital documents created by the scanner. For example, in one known DRM system, a scanner is connected to the DRM server by a network. When an operator uses the scanner to scan a hardcopy document into a digital document, the scanner prompts the operator to specify a rights management policy to be associated with the digital document. The scanner transmits a copy of the scanned digital document to the DRM server along with the operator's selection of right management policy. The DRM server applies the policy to the digital document, e.g., by adding the document ID of the digital document to the database table and associates it with the policy ID of the selected policy, and also embedding the document ID in the metadata of the digital document. The DRM server sends the protected version of the digital document back to the scanner. The operator at the scanner can then distribute the protected document, for example, by storing it or emailing it to various users. Here, a protected document refers to a digital document that has a rights management policy applied to it by the DRM server. Later, when a user attempts to access the protected document, access control can be accomplished by the DRM system in the method described above. An example of a scanner having DRM functions is the Canon imageRUNNER ADVANCE device, described in a document entitled "Safeguarding information Within Documents and Devices," available on the internet at http://www.usa.canon.com/CUSA/assets/app/pdf/ISG_Security/brochure_run_irad-v_security_.pdf.

SUMMARY

In existing DRM systems, when a user scans a document on a scanner, applies a DRM policy to protect the scanned digital document, and distributes the protected digital document via email, the DRM system will send the document via email only to the users who are listed in the policy. If the user who is distributing the document (referred to the document publisher in this disclosure) is not listed in the policy, then he will not receive the distributed email. A disadvantage of such a system is that the document publisher does not receive any confirmation about all the users to whom the document was distributed, nor a copy of the distributed document.

Accordingly, the present invention is directed to a method and related apparatus for protecting digital documents that substantially obviates one or more of the problems due to limitations and disadvantages of the related art.

An object of the present invention is to provide convenient confirmation for the document publisher during document protection and distribution and to allow the publisher access to the protected document.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a digital rights management (DRM) system, which includes: (a) receiving a digital document to be protected, user access rights information which specifies a list of selected users and access rights to be granted to the users with respect to the digital document, and a user ID of a publisher of the digital document; (b) applying DRM protection to the digital document, including: (b1) generating a unique document ID for the digital document; (b2) embedding the document ID as metadata in the digital document; (b3) generating an encryption key and encrypting the digital document; and (b4) storing, in a DRM database, the user access rights information and the encryption key in association with the document ID, and storing the user ID of the publisher in association with the document ID as a user to be granted access rights to the digital document; (c) generating a link for a web-based policy modification tool which allows the publisher to modify the user access rights information associated with the digital document stored in the DRM database; and (d) transmitting a confirmation notification to the publisher, the confirmation notification including: the list of selected users to be granted access to the digital document, a copy of the digital document or a download link for downloading a copy of the digital document, and the link to the web-based policy modification tool.

In another aspect, the present invention provides a computer program product comprising computer usable non-transitory media (e.g. memory or storage device) having computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

BRIEF DESCRIPTION OF THE DRAWINGS

FIGS. 3A and 3B schematically illustrates a policy table and a document-policy association table, respectively, that can be used in the above embodiment.

DETAILED DESCRIPTION OF PREFERRED EMBODIMENTS

The description herein of the structures, functions, interfaces and other relevant features, such as digital rights policies, application programming interface (API) for rights management and policies, etc., of existing DRM systems may at times incorporates, references or otherwise uses certain information, documents and materials from publicly and readily available and accessible public information, e.g., "Rights Management" (URL http://help.adobe.com/en_US/livecycle/10.0/Overview/WS92d06802c76abadb2c8525912ddcb9a ad9-7ff8.html), "Programmatically applying policies (a subsection of 'Rights Management')", (URL http://help.adobe.com/en_US/livecycle/10.0/Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc. Another example of digital rights management system is Microsoft Active Directory Rights Management; some documentations for this system are available on line at: http://technet.microsoft.com/en-us/windowsserver/dd448611.aspx, http://msdn.microsoft.com/library/cc530389(VS.85).aspx, and http://msdn.microsoft.com/en-us/library/cc542552(v=vs.85).aspx.

Embodiments of the present invention provide a document protection and distribution method which provides the document publisher a confirmation notification, which contains information about a list of the users to whom the document was distributed as well as a copy of the protected document that was distributed. In addition, the publisher is granted access to the protected document regardless of whether he is in the original policy used to protect the document. In one implementation, the method improves the "scan to email" function of scanners which allows an operator to scan a document and distribute it to multiple recipients directly from the scanner. In another implementation, the method improves a document distribution method by which a user protects and distributes digital documents from a client computer using an RMS web portal.

Figure 1:
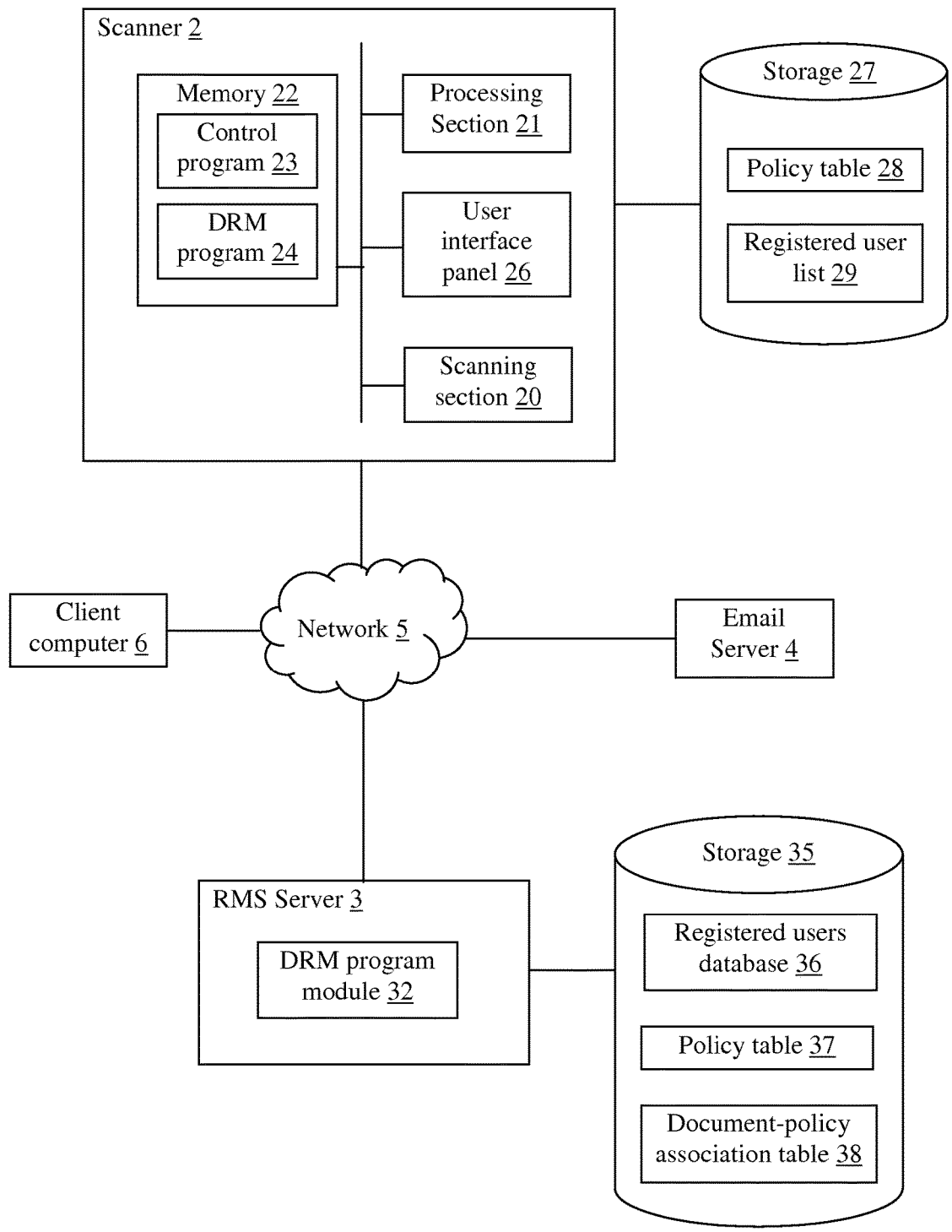
FIG. 1 schematically illustrates a digital rights management (RMS or DRM) system according to an embodiment of the present invention.

FIG. 1 schematically illustrates a digital rights management system (DRM or RMS) in which an embodiment of the present invention may be implemented. The system includes a scanner device 2 (more generally, a digital document generation apparatus), a digital rights management server (RMS server) 3, and an email server 4. The above component may be connected to each other via a network 5 such as the Internet or an intranet of an organization; alternatively, the scanner 2 and email server 6 may be connected to the RMS server 3 via an intranet while the user computer 4 is connected to the RMS server 3 via the Internet.

The scanner device 2 includes a processing section 21, a memory 22 storing a control program 23, an DRM program 24, a user interface panel 26, and a scanning section 20 which includes hardware that performs the scanning functions. The scanner device 2 may also include a storage device 27 (internal or external) which stores digital documents and DRM related tables described later. The processing section 21 executes the control program 23 and DRM program 24 to control the various functions of the scanner 2, including various steps of the digital rights management method described later. The RMS server 3 includes a processor which executes software programs 32 stored in a memory to perform various processes, including steps of the digital rights management method described later. The server 3 has a storage device 35 (internal or external) which stores digital documents and DRM related tables and other information described later (the digital documents and the various tables may be collectively referred to as the DRM database).

The DRM database stored in storage device 35 of the RMS server 3 includes a registered users database 36 storing information regarding users that are registered in the DRM system, a policy table 37 containing a list of rights management policies, and a document-policy association table 38. The policy table 37 (an example of which is schematically shown in FIG. 3A) specifies, for each rights management policy identified by a policy ID, the user access rights, i.e., which user has what kind of access rights (e.g. view, print, copy, etc.) under the policy, as well as other optional polity terms such as the time period the policy will be in force, other restrictions, etc. The document-policy association table 38 (an example of which is schematically shown in FIG. 3B) contains a list of documents identified by unique document IDs (which may be a license ID), along with a policy ID of the policy associated with each document, as well as other information (optional) about the document such as the encryption key used to encrypt the document, time of creation, license revoke status, etc. In addition, to implement embodiments of the present invention, the document-policy association table also contains the user ID of the publisher, which may be accomplished in various ways as will be described later.

The scanner 2 stores in its storage device 27 a local policy table 28, which may be identical to the policy table 37 on the server 3 or may contain a subset of the policies in the policy table 37 on the server. The storage device 27 may also store a registered user list 29, which may be identical to the registered user database 36 on the server 3 or may contain a subset of the users listed in the registered user database 36. The local policy table 28 and registered user list 29 may be updated from time to time by the server 3.

Figure 2A:
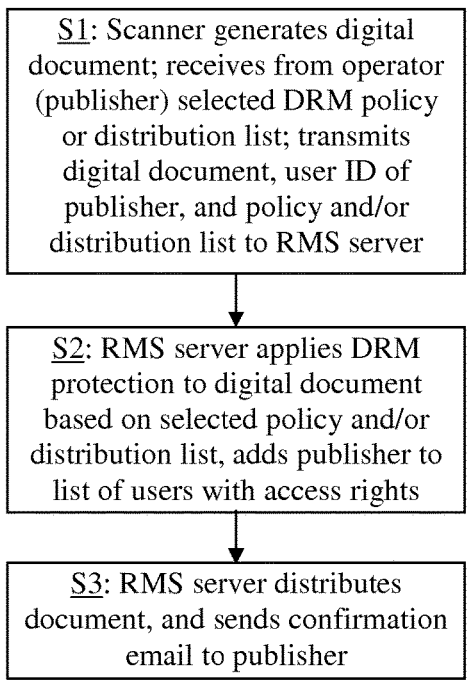
FIGS. 2A-2C schematically illustrate a method performed by the DRM system according to an embodiment of the present invention.

FIGS. 2A-2D schematically illustrate a process performed by the DRM system according to an embodiment of the present invention. FIG. 2A illustrates the overall method including steps performed by the scanner 2 and RMS server 3. As shown in FIG. 2A, the scanner generates a digital document by scanning a hardcopy document, receives from the operator (the document publisher) a selected DRM policy and/or a list of users to whom the document is to be distributed along with types of rights granted to each user (the distribution list), and transmits the digital document, the user ID of the publisher, and the policy and/or distribution list to the RMS server (step S1). The RMS server 3 applies DRM protection to the digital document based on the selected policy and/or the distribution list, including granting the publisher access to the document (step S2). The RMS server 3 also distributes the document to the intended recipients according to the distribution list, and composes and sends to the publisher a confirmation notification, which contains the distribution list, the protected digital document (or a link to download it), and a link to a web-based policy modification tool which will allow the publisher to modify user access rights to the digital document (step S3).

Figure 2B:
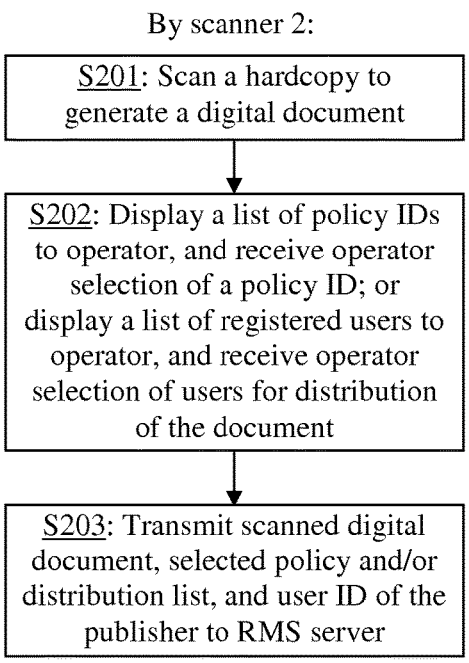

FIG. 2B illustrates the method steps performed by the scanner device 2. The scanner 2 scans a hardcopy document to generate a digital document (step S201). Using the user interface panel 26, the scanner displays a list of rights management policies to the operator (publisher) and prompts the operator to select a policy to be applied to the digital document (step S202). As an alternative to displaying a list of policies for the operator to select from, in step S202, the scanner may display to the operator a list of registered users of the DRM system and prompt the operator to select the users to whom the digital document is to be distributed and specify the access rights to be granted to each of them. As another alternative, the scanner may first display a list of policies, and after the operator selects a policy, the scanner display a user list indicating which users will be given access under the selected policy and prompt the operator to modify the user list and/or the access rights granted to each user. The list of selected users with the associated access rights specified by the operator is referred to as a distribution list. Preferably, the scanner 2 access the local policy table 28 or local registered user list 29 to generate the display in step S202; alternatively, if the scanner 2 does not store a local policy table or a local registered user list, it may contact the RMS server 3 to obtain the list of policies or registered user list to be displayed to the operator. The scanner 2 then transmits the scanned digital document, the selected policy and/or the distribution list, along with the user ID of the operator (the publisher), to the RMS server 3 (step S203).

Figure 2C:
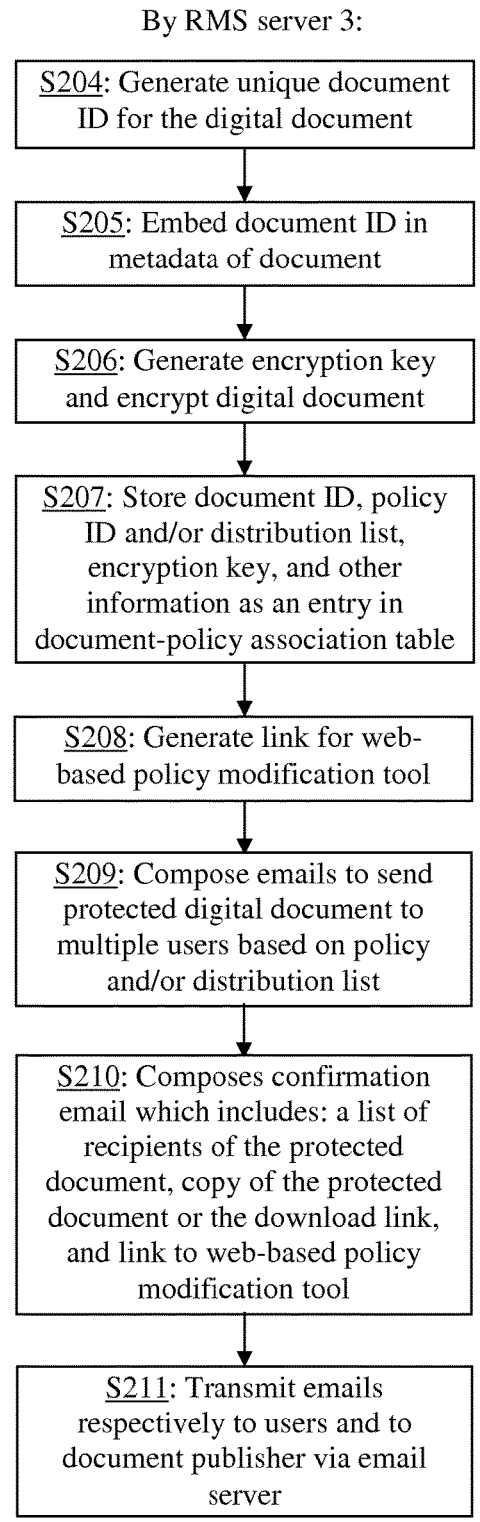

FIG. 2C illustrates the method steps performed by the RMS server 3. Upon receiving the digital document, the selected policy and/or the distribution list, and the user ID of the publisher, the RMS server applies DRM protection to the digital document, including steps S204-S207. More specifically, the RMS server generates a unique document ID for the digital document (step S204). The document ID is embedded in the digital document as a part of its metadata (step S205). A URL (Uniform Resource Locator) of the RMS server may also be embedded in the metadata of the document in this step. The RMS server also generates an encryption key and encrypts the digital document (step S206). The resulting digital document is a protected digital document recognized in the DRM system. The RMS server stores the document ID, policy ID, encryption key, the user ID of the publisher, and other information (optional) about the document as an entry in the document-policy association table 38 (step S207). The RMS server stores the protected digital document in the DRM database; it may also store the original digital document received from the scanner 2 in the DRM database.

The process of applying rights management policy to the digital document may include some alternative or optional steps. For example, if the RMS server 3 received from the scanner 2 only the distribution list rather than a selected DRM policy, the RMS server may select from its policy table 37 a policy that matches the distribution list, or if one does not exist, create such a policy and add it to the policy table.

In conventional DRM systems described in the Background section, the RMS does not store the user ID of the publisher in the document-policy association table, only the policy ID which can be used to look up the users who have access under the policy. In an improved DRM system described in commonly owned U.S. patent application Ser. No. 14/194,641, filed Feb. 28, 2014, each entry of the document-policy association table additionally contains a list of users along with their access rights granted for that document. In embodiments of the present invention, the user ID of the publisher is added to the document-policy association table. This may be done in a number of ways.

In one example, shown in FIG. 3B, all the users who have access rights to a document are expressly listed in the document-policy association table, and the publisher (UserP1 for Doc ID1 in this example) is added to that list, so that the publisher will be granted access to the document by the RMS server. This is similar to the method used in the above-mentioned application U.S. Ser. No. 14/194,641, except that the publisher is added to the list of user associated with each document.

In another example (not shown in the drawings), the policy ID is included in the document-policy association table but the list of all users having access rights is not, and the user ID of the publisher is added to the table as a separate "publisher" field. In this example, when a user later requests access to the document, the RMS server will look up the policy associated with the document to determine whether the user has access rights; and the RMS server will also check the "publisher" field in the document-policy association table and will grant access to the publisher, regardless of whether the publisher is also granted access rights under the associated policy.

In yet another example (not shown in the drawings), the policy associated with the document is modified to add the publisher, so that the publisher will have access to the document. This alternative is less preferred because it requires modifying the policy table 37.

In an alternative embodiment, in lieu of or in addition to the policy table, which has one entry for each policy to specify the user rights under that policy, and the document-policy association table, which has one entry for each document which specifies the associated policy or list of users, the DRM database contains a table that stores, for each user, which documents the user is granted access to and the type of access rights. This is referred to a "user-centric" approach, which is described in commonly owned U.S. Pat. Appl. Pub. No. 2014/0282842. In this alternative embodiment, in step S207, the RMS server will add the document ID to the DRM databased under the publisher's user ID, in addition to the user IDs of other users in the distribution list, so that the publisher will be granted access to the document.

In the various embodiments, a policy and/or a distribution list is/are used to specify a list of selected users and the access rights to be granted to the users with respect to the document. More broadly, the information about the list of selected users and the access rights to be granted to them may be referred to as user access rights information for the document; it may be in the form of either a policy or a list of users and their access rights. The user access rights information is transmitted from the scanner to the RMS server, and from the RMS server to the email server. Step S207 may more broadly include storing the user access rights information for the document in the DRM database, regardless of the form of the information. The RMS server can later use this information to determine whether an access request from a user should be granted.

By adding the publisher to the document-policy association table, the publisher will always be given access to the document, regardless of the original policy. An additional advantage of adding the publisher to the document-policy association table is that, even if for some reason the policy is empty (i.e. containing no users), the publisher can still access that document. As users may be added to and deleted from a policy, sometimes a policy becomes empty due to deletion of users; by using embodiments of the present invention, such a policy—including all other settings in the policy—can still be preserved on the RMS server and used to protect documents, and later users may be added back to the policy.

The RMS server also provides a web-based policy modification tool that will allow the document publisher to modify the DRM policy that has been applied to the digital document, and generates a link, e.g. an URL, for the web-based tool (S208). The policy modification tool, which may be implemented using known technology, will allow the publisher to, for example, grand access rights to additional users or revoke access rights granted to some users. The link to the policy modification tool preferably includes the document ID and/or other identifying information.

The RMS server 3 then composes emails to send the protected digital document to a plurality of users based on the applied policy or the distribution list (step S209). Further, the RMS server 3 composes a confirmation email to be sent to the publisher, which includes: a list of users to whom the protected document was or will be sent, a copy of the protected digital document or the link for downloading it, and the link to the web-based policy modification tool (step S210). These emails are transmitted respectively to the users in the distribution list and to the publisher, for example via the email server 4 (step S211). The email is an HTML/MIME email. Optionally, the RMS server can apply DRM protection to the confirmation email itself using the same policy.

The method described above can process multiple documents at once. The scanner 2 can scan multiple documents and transmit them to the RMS server 3; the RMS server protects each of them, and transmits them to the users via the email server 4.

The above method allows the document publisher to receive a confirmation notification with a copy of the protected document or a link to download a copy, so that he can easily see which users this document was distributed to. It also allows the publisher to easily grant access rights to more users or revoke access rights to some of the users to whom this document was already sent.

In alternative embodiments, the confirmation notification may be send to the document publisher using other means such as SMS, text message, other forms of messages, etc. instead of email notification. The confirmation notification may also be accomplished using the scanner device 2 itself, by displaying the confirmation notification on the user interface screen of the scanner, or using the URL for a confirmation web page. To implement these alternative embodiments, the RMS server 3 will collect information needed to distribute confirmation to publisher by the various means, for example the email address and mobile phone number, etc. beforehand and store it in association with the user IDs in the DRM database. The RMS server or other message servers will compose the confirmation notification based on the type of notification. In a further embodiment, the operator may be given a choice to decide the means of receiving the confirmation notification, and the RMS server will generate the confirmation accordingly.

As can be seen above, the various components—the scanner 2, the RMS server 3, and optionally other servers, collectively form the DRM system; each component performs some of the steps of the DRM method, and stores necessary DRM information such as the policy table, registered user list, etc. It should be understood that the various steps described above as being performed by one component may alternatively be performed by another component, and the information transmitted between the components will depend on the steps performed by each component. For example, in some alternative embodiments, some of the steps shown in FIG. 2C may be performed by the scanner 2 in collaboration with the RMS server 3. For example, the RMS server may generate the document ID and encryption key and send them to the scanner, and the scanner may embed the document ID, encrypt the document, and send the encrypted document to the users on the distribution list via the email server. The scanner may also perform the steps of composing and sending the confirmation email to the publisher.

The method for generating a confirmation notification may be applied not only for scanning documents on a scanner but also for protecting and distributing documents on a client computer 6 (see FIG. 1) using an RMS web portal on the server 3. The user uses the client computer, in collaboration with the web portal, to generate a digital document and selects a policy or distribution list, and transmits the document and the policy and/or distribution list to the server 3, similar to the steps performed by the scanner shown in FIG. 2B. Preferably, the confirmation will be sent to the publisher upon completion of the request to protect a document, regardless of whether the request is ultimately successful. The application on the client computer will collect information about the request such as Protect Document Results including permissions, destination where confirmation should be sent to, link to download the protected document, link to modify the access rights granted to users, and email address of users who are given permissions to the secured documents.

In an alternative embodiment, before sending the protected document to the recipients, i.e. before performing step S211, the RMS server sends an email to the publisher which contains the a list of recipients of the protected document and a copy of the protected document; the email further contains a "distribute" link which will cause the RMS server to distribute the protected document to the listed recipients. Thus, the publisher can review the information contained in the email, and click the "distribute" link if the information is satisfactory. The email may also contain a link to the web-based policy modification tool, which allows the publisher to modify the user access if he desires.

The methods according to various embodiments of the present invention can achieve the following results: The publisher can verify the confirmation email and check if the document was not sent to any wrong users. If it was sent to any wrong users, the publisher can use the link to the policy modification tool in the confirmation email to revoke the document from those users. Likewise, if the publisher forgot to include some users who should be given access, he can also use the link to grant access to additional users. The publisher will also receive a copy of the protected document. Unlike a confirmation email in typical e-commerce transactions, the confirmation described in embodiment of the present invention can allow the publisher to modify access rights granted to users even after the document has been delivered to the recipients; as a result, if a mistake is discovered that the document has already been transmitted to a user who should not be given access, the publisher can correct that mistake by changing the access rights using the links provided in the confirmation.

It will be apparent to those skilled in the art that various modification and variations can be made in the digital rights management method and related apparatus of the present invention without departing from the spirit or scope of the invention. Thus, it is intended that the present invention cover modifications and variations that come within the scope of the appended claims and their equivalents.

What is claimed is:

1. A method implemented in a digital rights management (DRM) system, comprising:
   (a) receiving a digital document to be protected, user access rights information which specifies a list of selected users and access rights to be granted to the users with respect to the digital document, and a user ID of a publisher of the digital document;
   (b) applying DRM protection to the digital document, including:
   (b1) generating a unique document ID for the digital document;
   (b2) embedding the document ID as metadata in the digital document;
   (b3) generating an encryption key and encrypting the digital document; and
   (b4) storing, in a DRM database, the user access rights information and the encryption key in association with the document ID, and storing the user ID of the publisher in association with the document ID as a user to be granted access rights to the digital document;
   (c) providing a web-based policy modification tool which is configured to allow the publisher to modify the user access rights information associated with the digital document which has been stored in the DRM database in step (b4), including to grand access rights to additional users and to revoke access rights that were previously granted to some users;
   (d) generating a link to the policy modification tool, the link containing the document ID of the digital document, the link allows the publisher to modify the user access right information associated with the digital document;
   (e) distributing the digital document to the users in the list of selected users; and
   (f) sending a confirmation notification to the publisher, the confirmation notification including: the list of selected users to be granted access to the digital document, a copy of the digital document or a download link for downloading a copy of the digital document, and the link to the web-based policy modification tool.

2. The method of claim 1, wherein in step (a), the DRM system receives the user ID of the publisher, the digital document and the user access rights information from a scanning device connected to the server.

3. The method of claim 1, wherein in step (a), the DRM system receives the user ID of the publisher, the digital document and the user access rights information from a client computer connected to the server.

4. The method of claim 1, wherein the DRM system includes a scanning device and a DRM server, and wherein step (a) is performed by the scanning device and includes scanning a hard copy document.

5. The method of claim 1, wherein the confirmation notification is an email.

6. The method of claim 1, wherein the user access rights information includes a selected policy ID of a rights management policy, wherein the DRM database includes a policy table storing a plurality of rights management policies each specifying a list of users and access rights to be granted to the users under the policy, and wherein step (b4) includes storing, in a document-policy association table, an entry that associates the document ID of the digital document with the selected policy ID and, user ID of the publisher and the encryption key.

7. The method of claim 1, wherein step (b4) includes storing, in a document-policy association table of the DRM database, an entry that associates the document ID of the digital document with the list of selected users and access rights to be granted to the users contained in the user access rights information and the user ID of the publisher.

8. A computer program product comprising one or more computer usable non-transitory media having computer readable program code embedded therein for controlling a digital rights management (DRM) system, the computer readable program code configured to cause the DRM system to execute a DRM process, the process comprising:
   (a) receiving a digital document to be protected, user access rights information which specifies a list of selected users and access rights to be granted to the users with respect to the digital document, and a user ID of a publisher of the digital document;
   (b) applying DRM protection to the digital document, including:
   (b1) generating a unique document ID for the digital document;
   (b2) embedding the document ID as metadata in the digital document;
   (b3) generating an encryption key and encrypting the digital document; and
   (b4) storing, in a DRM database, the user access rights information and the encryption key in association with the document ID, and storing the user ID of the publisher in association with the document ID as a user to be granted access rights to the digital document;
   (c) providing a web-based policy modification tool which is configured to allow the publisher to modify the user access rights information associated with the digital document which has been stored in the DRM database in step (b4), including to grand access rights to additional users and to revoke access rights that were previously granted to some users;
   (d) generating a link to the policy modification tool, the link containing the document ID of the digital document, the link allows the publisher to modify the user access right information associated with the digital document;

(e) distributing the digital document to the users in the list of selected users; and (f) sending a confirmation notification to the publisher, the confirmation notification including: the list of selected users to be granted access to the digital document, a copy of the digital document or a download link for downloading a copy of the digital document, and the link to the web-based policy modification tool.

9. The computer program product of claim 8, wherein in step (a), the DRM system receives the user ID of the publisher, the digital document and the user access rights information from a scanning device connected to the server.

10. The computer program product of claim 8, wherein in step (a), the DRM system receive the user ID of the publisher, the digital document and the user access rights information from a client computer connected to the server.

11. The computer program product of claim 8, wherein the DRM system includes a scanning device and a DRM server, and wherein step (a) is performed by the scanning device and includes scanning a hard copy document.

12. The computer program product of claim 8, wherein the confirmation notification is an email.

13. The computer program product of claim 8, wherein the user access rights information includes a selected policy ID of a rights management policy, wherein the DRM database includes a policy table storing a plurality of rights management policies each specifying a list of users and access rights to be granted to the users under the policy, and wherein step (b4) includes storing, in a document-policy association table, an entry that associates the document ID of the digital document with the selected policy ID and, user ID of the publisher and the encryption key.

14. The computer program product of claim 8, wherein step (b4) includes storing, in a document-policy association table of the DRM database, an entry that associates the document ID of the digital document with the list of selected users and access rights to be granted to the users contained in the user access rights information and the user ID of the publisher.

* * * * *